United States Patent [19]

Constance

[11] 4,391,865

[45] Jul. 5, 1983

[54] THERMAL DRAPERY CONSTRUCTION

[76] Inventor: Lillie B. Constance, 753 East St., Woodland, Calif. 95695

[21] Appl. No.: 308,626

[22] Filed: Oct. 5, 1981

[51] Int. Cl.³ .......................... B32B 15/14; B32B 5/22
[52] U.S. Cl. ....................................... 428/74; 160/330;
160/DIG. 7; 428/192; 428/285; 428/332;
428/920
[58] Field of Search ................. 428/285, 282, 246, 74,
428/102, 193, 192, 194, 457, 332, 920, 18;
160/DIG. 7, 330, 124

[56] References Cited
U.S. PATENT DOCUMENTS 3,769,146 10/1973 Ravel ................................. 428/285
4,039,709 8/1977 Newman ............................ 428/920

Primary Examiner—Paul J. Thibodeau
Attorney, Agent, or Firm—Townsend and Townsend

[57] ABSTRACT

A thermal drapery construction including first and second metalized fabric panels, a third panel of high loft, low density, randomly oriented fibers disposed between the first and second panels and a thermal drapery liner located adjacent the metalized surface of the second fabric panel. The panels and liner are typically bound together along their aligned outer edges to form a highly insulating liner assembly. The liner assembly is lightweight, flexible, drapes well and can be used in conjunction with a decorative drapery fabric opposite the metalized surface of the first fabric panel to form pleated hung draperies. Adhesive means, such as magnetic strips, can be attached to the outer surface of the liner to seal against heat loss between the liner assembly and the window.

9 Claims, 4 Drawing Figures

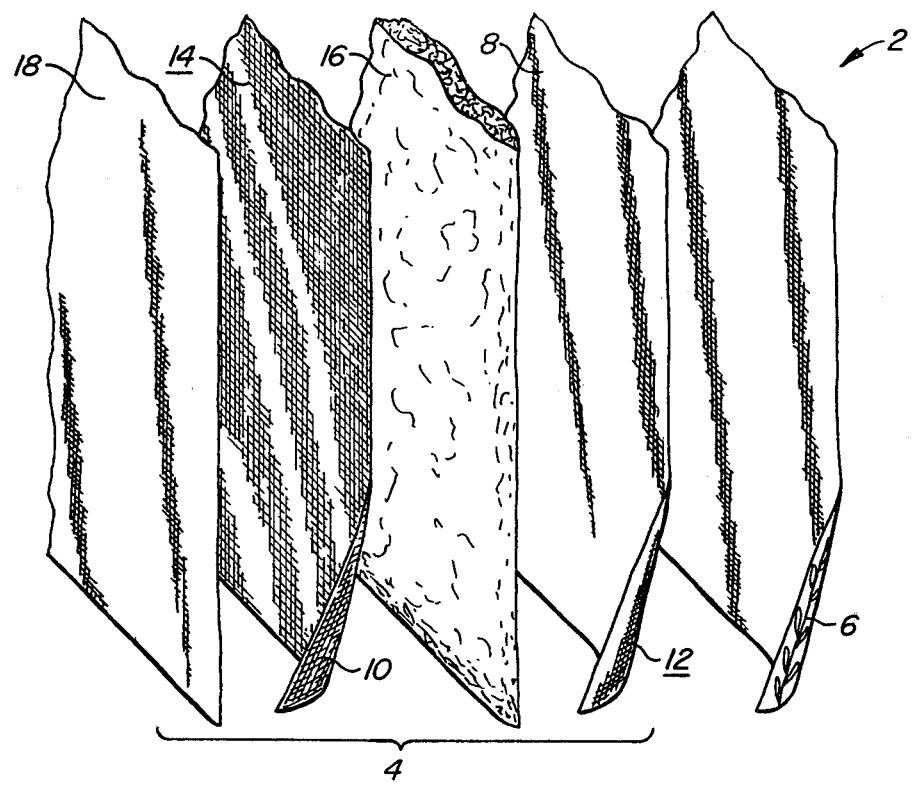
FIG._1.
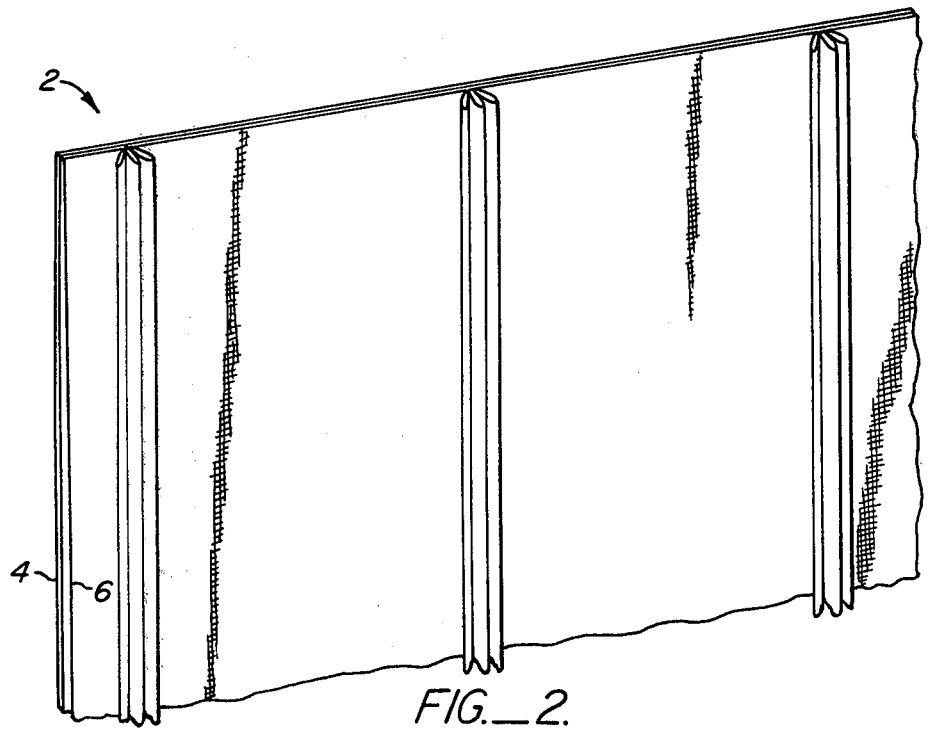
FIG._2.

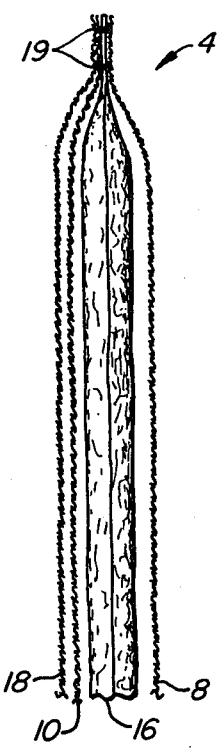
FIG._3.
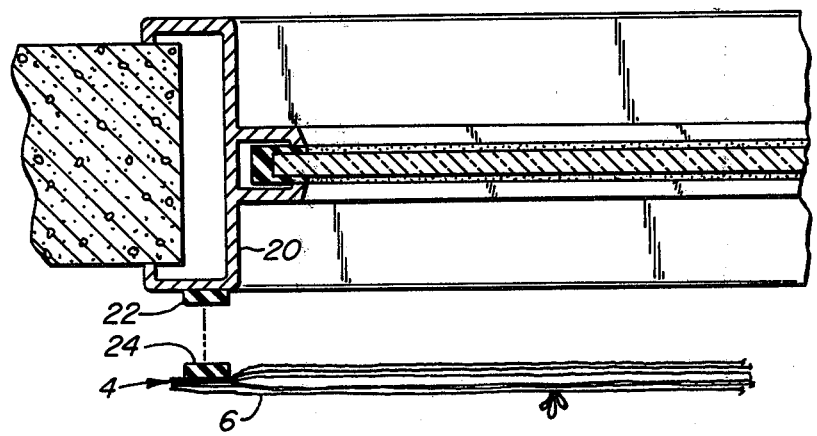
FIG._4.

THERMAL DRAPERY CONSTRUCTION

BACKGROUND OF THE INVENTION

Windows are commonly accepted as the source of the greatest loss of energy in the home. That is, a great deal of heat is lost through the windows during the winter and a great deal of unwanted heat is admitted through windows during the summer. There are many ways to reduce the undesirable transfer of heat through the windows. One is to eliminate the window entirely. This is a rather unacceptable solution for it also eliminates aesthetically pleasing views through the window, desirable solar energy gains through the window during the daytime in the winter, and ventilation through the window when opened.

Another method to prevent heat transfer through windows is to use either insulated shutters mounted to the window frame or removable insulated panels. These methods also have their drawbacks. Exterior shutters are inconvenient at best. Interior shutters often cannot be used because of their bulk and can be objectionable from an aesthetic standpoint. Removable insulated panels, which are simply insulated panels made to fit within the window frame, are difficult to store when not in use and are usually less than attractive. A third method is use of reflective film which may be placed on the window to reflect the summer sun, but it also reflects desirable winter sun as well. Further, the film provides a very small degree of insulation from conduction heat loss through the window during the winter and allows a significant amount of radiant heat to enter into the room during the summer.

Another method of insulating windows is through the use of quilted window shades. Quilted shades are typically housed on a roller and can have their edges adapted to run along a track along the sides of the window. However, these shades often require somewhat complicated and bulky roller arrangements and generally are not attractive.

Conventional draperies offer some insulation to windows, are attractive, convenient to use and can be drawn to admit winter sunlight. However, presently available insulated draperies are either excessively bulky so they do not drape properly and are rather unattractive, or they are made of materials which may drape well but are relatively poor insulators.

SUMMARY OF THE INVENTION

A thermal drapery construction is disclosed and includes first and second fabric panels having outwardly facing metalized surfaces, a third panel of high loft, low density, randomly oriented fibers disposed between the first and second panels and a thermal drapery liner located adjacent the metalized surface of the second fabric panel. The panels and liner are typically bound together along their aligned outer edges to form a highly insulating liner assembly. The liner assembly is lightweight, flexible, drapes well and is used in conjunction with a decorative drapery fabric hung opposite the metalized surface of the first fabric panel to form pleated, hung draperies. Adhesive means, such as magnetic strips, can be attached to the outer surface of the liner and the window frame to prevent heat transfer between the liner assembly and the window.

A primary advantage of the present invention is that it provides excellent insulating properties in a liner assembly which is both light enough and flexible enough to be able to be used with pleated, hung draperies. Thus, the user can have both the attractiveness of pleated drapes and the insulating properties normally only associated with relatively bulky quilted shades or even removable insulated panels.

The liner assembly combines the reflective insulating properties provided by the metalized surfaces of the first and second fabric panels with the dead air space type of insulation provided by the third panel. Thus, the liner provides high conductive and radiative insulating properties to reject summer heat and to retain winter warmth. The liner has good insulating properties itself and is used between the metalized surface of the second panel and the window. This protects the metalized surface from damage as well as eliminating any objectionable metalic reflection through the window from the metalized surface.

The first and second panels are preferably the type which are fire resistant to increase the safety of the user. Further, washable panels and liners, from which the liner assembly is made, can be obtained, a significant advantage in areas such as hospitals.

Other features and advantages of the present invention will appear from the following description in which the preferred embodiment has been set forth in detail in conjunction with the accompanying drawing.

BRIEF DESCRIPTION OF THE DRAWING

FIG. 1 is an exploded perspective view of the thermal drapery construction of the invention.

FIG. 2 is a front view showing the drapery construction of FIG. 1 in the form of pleated, hung draperies.

FIG. 3 is a partial cross-sectional view of the liner assembly of FIG. 1 showing the bound edges.

FIG. 4 is a partial cross-sectional view showing the attachment of the linear assembly to a window frame using magnetic strips.

DETAILED DESCRIPTION OF THE PREFERRED EMBODIMENT

Turning now to the figures, a drapery construction 2 of the present invention includes broadly a liner assembly 4 and a decorative drapery fabric panel 6.

Liner assembly 4 includes first and second reflective fabric panels 8, 10 each having a metalized surface 12, 14 facing away from one another. Panels 8, 10 may be of the type made by the Duracote Corporation of Ravenna, Ohio, and sold under the trademark Foylon. Situated between reflective panels 8, 10 is a relatively thick (about 7–14 mm) insulating panel 16. Panel 16 is preferably made of high loft, low density (about 0.014 g/cm$^3$) batting of randomly oriented fibers such as that made by the 3 M Corporation of St. Paul, Minn., and sold under the trademark Thinsulate. Panels 8, 10 are slightly porous to permit evaporation of moisture which may become trapped between them.

A liner panel 18 is typically provided to cover metalized surface 14 of reflective panel 10. The liner panel is used to protect metalized surface 14 from abrasion as well as to insert a light colored fabric between metalized surface 14 and the window to shield the highly reflective metalized surface 14 from view through the window. Panel 18 may be a tightly woven insulating fabric for added insulation. In certain circumstances it may be desirable to use a somewhat loosely woven fabric for liner panel 18 so that heat does not build up between panels 18 and 10. Liner assembly 4, as shown in FIG. 3, is bound about its peripheral edge, such as stitching 19, to form a unitary insulated liner assembly. Decorative drapery fabric 6 is hung covering metalized surface 12 of reflective panel 8.

The combination of outwardly reflecting reflective panels 8, 10 covering the relatively thick insulating panel 16 acts to provide a highly efficient thermal barrier over the window during both the summer and the winter. For better insulation the edges of liner assembly 4 can be attached along a window frame 20, shown in FIG. 4, by magnetic strips 22, 24 attached to liner panel 18 and window frame 20 respectively. Strips 22, 24 can be an adhesive backed, flexible tape such as that made by the 3 M Company of St. Paul, Minn. and sold as Scotch Brand Magnet Tape. Such tape is flexible and easily attached to liner assembly 4 and window frame 20.

Modification and variation can be made to the disclosed embodiment without departing from the subject of the invention as defined in the following claims.

I claim:

1. A thermal drapery construction suitable for use in making hung draperies comprising:
   a decorative flexible drapery fabric; and
   a flexible liner assembly means, attached to said drapery fabric, for thermally lining said drapery fabric comprising:
      a first fabric panel having a first metalized surface facing an inside direction and a second surface facing an outside direction;
      a second fabric panel disposed adjacent the first panel and having a first metalized surface facing the outside direction and a second surface facing the inside direction and the second surface of the first panel;
      a third relatively thick, low density flexible panel situated between the second surfaces of the first and second panels, said third panel having a low density to form a dead air space between said first and second panels;
      said first, second and third panels having aligned outer edges; and
      means for binding the aligned outer edges of said first, second and third panels.

2. The drapery construction of claim 1 further comprising a fabric liner disposed adjacent the first metalized side of the second fabric panel.

3. The drapery construction of claim 1 wherein said first and second panels are porous to permit moisture evaporation from between said first and second panels.

4. The drapery construction of claim 3 wherein said third panel comprises high loft non-woven battings of randomly dispersed fibers.

5. The drapery construction of claim 4 wherein said third panel is about 7–14 mm thick.

6. The drapery construction of claim 5 wherein the density of said third panel is about 0.014 g/cm$^3$.

7. The drapery construction of claim 1 further comprising attachment means for securing the outer edges of the liner assembly to a surface to retard heat flow between the liner assembly and said surface.

8. The thermal drapery construction of claim 1 wherein said binding means binds the aligned outer edges leaving the remainder of the liner assembly substantially unbound.

9. A thermal drapery liner assembly for use in combination with a decorative drapery fabric comprising:
   first and second fabric panels each having a metalized surface, said first and second panels opposed and arranged parallel to one another with their respective metalized surfaces facing outwardly in opposite directions, said first and second panels being porous to permit evaporation of moisture from between the first and second panels;
   a third panel of high loft, low density randomly oriented fibers disposed between the first and second panels;
   a fabric liner located adjacent the metalized surface of the second panel, the respective edges of said panel and liner being generally aligned; and
   means for binding together the first, second and third panels and the liner along their edges leaving the remainder of the panels and liner substantially unconnected.

* * * * *